US009030728B2

(12) United States Patent
Gibson et al.

(10) Patent No.: US 9,030,728 B2
(45) Date of Patent: May 12, 2015

(54) REFLECTIVE DISPLAY

(75) Inventors: Gary Gibson, Palo Alto, CA (US); Xia Sheng, Palo Alto, CA (US); Dick Henze, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/005,752

(22) PCT Filed: Mar. 25, 2011

(86) PCT No.: PCT/US2011/030069
§ 371 (c)(1),
(2), (4) Date: Sep. 17, 2013

(87) PCT Pub. No.: WO2012/134434
PCT Pub. Date: Oct. 4, 2012

(65) Prior Publication Data
US 2014/0009814 A1  Jan. 9, 2014

(51) Int. Cl.
*G02B 26/00* (2006.01)
*G02F 1/167* (2006.01)

(52) U.S. Cl.
CPC ............. *G02B 26/005* (2013.01); *G02F 1/167* (2013.01)

(58) Field of Classification Search
CPC .............................. G02B 26/00; G02B 26/004
USPC .......... 359/228, 237, 238, 290, 665; 345/105; 362/96, 101; 368/65; 40/406–408, 422
See application file for complete search history.

(56) References Cited

U.S. PATENT DOCUMENTS

| 8,824,039 B2 * | 9/2014 | Bitman et al. ................ 359/290 |
| 2006/0103909 A1 | 5/2006 | Benning et al. |
| 2008/0297880 A1 | 12/2008 | Steckl et al. |

FOREIGN PATENT DOCUMENTS

| TW | 200632496 A | 9/2006 |
| TW | 200923412 A | 6/2009 |
| TW | 201101266 A | 1/2011 |
| WO | WO-2008115716 A2 | 9/2008 |

OTHER PUBLICATIONS

S. Yang et al., "High Reflectivity Electrofluidic Pixels with Zero-power grayscale operation" Applied Physics Letters 97, 143501, American Institute of Physics, 2010.

* cited by examiner

*Primary Examiner* — Tuyen Tra
(74) *Attorney, Agent, or Firm* — Mannava & Kang

(57) ABSTRACT

A display element comprises a reservoir and a channel connected to the reservoir. The channel extends across an area including a visible area of the display element, and the reservoir is substantially outside the visible area. The display element further comprises at least one electrode and a luminescent fluid in the reservoir and movable, by means of signals applied to the at least one electrode, between a first position and a second position. In the first position, the luminescent fluid is substantially contained in the reservoir outside the visible area and in the second position, the luminescent fluid extends along the channel to occupy the visible area. The luminescent fluid absorbs light in a first color waveband and converts the absorbed light to light in a second color waveband different from the first color waveband.

15 Claims, 5 Drawing Sheets

REFLECTIVE DISPLAY

The present disclosure relates to reflective displays, including full-color reflective displays.

A reflective display is a device formed of non-emissive display elements, in which ambient light is modulated by the display elements and reflected back to the viewer. The display elements are controlled so as to modulate light reflected back to the viewer to display an image.

Since reflective displays use ambient light, a challenge is to provide a full-color display, which reflects sufficient light to the viewer under different ambient lighting conditions.

DETAILED DESCRIPTION

Figure 1:
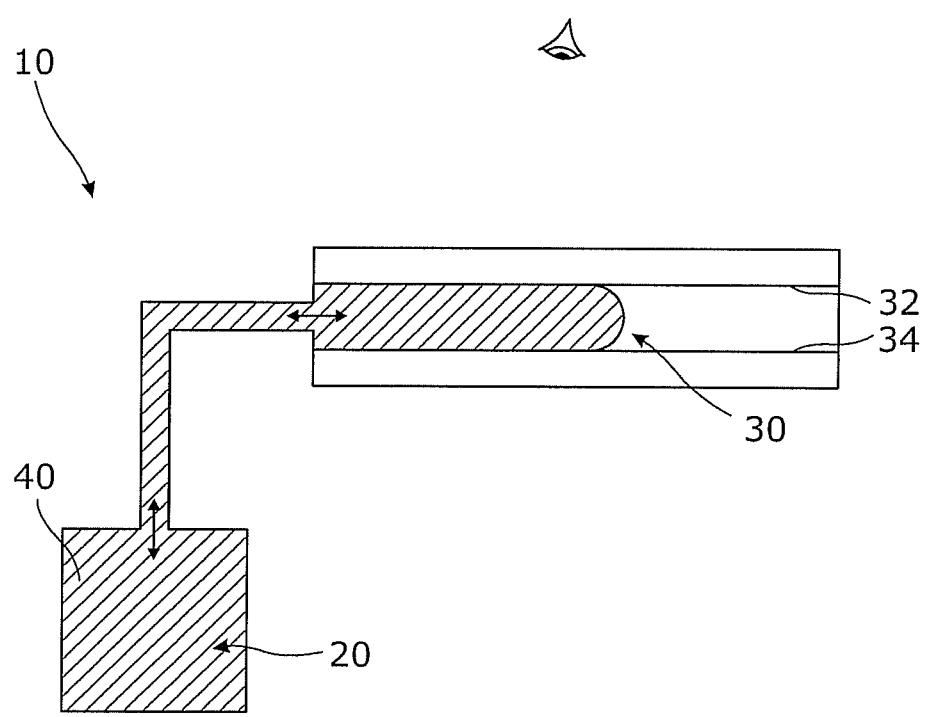
FIG. 1 is a schematic side view of a generalized display element in accordance with a first example of the present disclosure.

The present disclosure provides display elements, which may be used to form a monochromatic, polychromatic or full-color reflective display. As will become apparent from the following description, the use of such display elements provides improvements in reflectivity and brightness, and improved color gamut in a full color reflective display.

The drawings are schematic and not to scale. Like reference numerals in different drawings are used to denote the same or similar features.

DEFINITIONS

In the following description, the term "transparent" means substantially 100% transmissive of wavelengths in and around the visible spectrum.

The term "light" means electromagnetic radiation having wavelengths in and around the visible spectrum.

References to "colored light" or "wavelengths/light of a (particular) color" mean light having wavelengths within a particular color waveband (i.e., wavelength range) within the visible spectrum. For example, the red waveband generally corresponds to wavelengths of 580 to 650 nm, the green waveband generally corresponds to wavelengths of 490 to 580 nm and the blue waveband generally corresponds to wavelengths of 400 to 490 nm. This may include light having wavelengths within more than one waveband, which combine to appear the particular color, such as yellow (combined green and red wavelengths), magenta (combined blue and red wavelengths), and cyan (combined green and blue wavelengths).

An ideal absorber/reflector of light of a particular color absorbs/reflects light of wavelengths only within the particular color waveband.

The term "white light" means light having a spectral profile in the visible spectrum, that it is perceived as white by the human eye. Examples of white light include sunlight and light from some incandescent light sources.

The term "luminescent" means having the property of luminescence (including photoluminescence), i.e., able to absorb light of one wavelength/waveband and re-emit at least some of the absorbed energy in a different wavelength/waveband; the term "luminescent species" means atoms, molecules or groups thereof having the property of luminescence (including photoluminescence).

Terms such as "over" and "under", "above" and "below", "front" and "rear" etc., are used merely to indicate the relative position of features in the incident light path as illustrated to the drawings, and do not signify the orientation of such features in a display device.

Display Element Examples

An example reflective display element according to the present disclosure comprises a luminescent fluid, such as a solution of luminescent species including luminescent dye molecules, oligomers or polymers, or luminescent species including luminescent pigments or particle suspended in a fluid medium, movable into and out of a viewing area in an electrofluidic cell. Example implementations include single color and full color display elements as described below.

FIG. 1 is a schematic side view of an example of a generalized display element 10 according to the present disclosure. Display element 10 produces light of a desired color in an ON state, as described below. In the illustrated example, the display element 10 includes a fluid reservoir 20 (extending substantially vertically in the illustrated example) substantially outside a visible area of the display element 10, in communication with a channel 30 (extending substantially horizontally in the illustrated example) in an area comprising the visible area of the display element, between an upper surface 32 and a lower surface 34. The visible area comprises an area that can be seen by a viewer from the front of the display element; thus, fluid reservoir may be at a side/edge of a visible area of the channel 30 (e.g., concealed by the interface between display elements), or below the channel 30 (e.g., beneath a non-transparent substrate forming the lower surface 32 of channel 30). Fluid reservoir 20 and interconnected channel 30 together form an electrofluidic cell containing at least one fluid. The display element 10 further includes one or more electrodes (not shown).

A luminescent fluid 40 is held within the fluid reservoir 20 and may be moved into and out of the visible area of the cell (as shown by arrows) using electrofluidic effects such as electrowetting, by applying appropriate signals, such as biasing voltages, to the electrode(s). Thus, the fluid reservoir 20 is a region where the luminescent fluid 40 collects when it is substantially outside the visible area of the display element.

The luminescent fluid 40 absorbs incident/ambient light in a range of wavelengths (e.g., one or more wavebands) and emits the absorbed energy at wavelengths that contribute to the desired color. The luminescent fluid 40 may also scatter some wavelengths of light corresponding to the color of the display element. In particular, the luminescent fluid 40 is chosen to enhance the intensity of modulated light (e.g., of the desired color) when it occupies the visible area, i.e., the display element 10 is in an ON state.

In particular, the luminescent fluid 40 may comprise a solution of luminescent species such as luminescent dye molecules, oligomers or polymers that absorb light within a range of wavelengths and then emit light in a different (possibly overlapping) range of wavelengths (corresponding to the color of the display element). The luminescent fluid 40 may comprise luminescent species, suspended in a fluid medium, that absorb light within a range of wavelengths and then emit light in a different (possibly overlapping) range of wavelengths (corresponding to the color of the display element). Examples of suitable luminescent species described below. Multiple luminescent species may be used to provide a large absorption waveband and efficient emission at desired wavelengths. This can be accomplished through energy transfer processes between species such as non-radiative Förster exchange or radiative emission and reabsorption.

The use of a luminescent fluid 40 to modulate light and produce the desired color of the display element, in the ON state, provides improved color intensity and brightness compared with conventional, absorber-based light modulating fluids, as discussed in further detail below.

Example implementations of the example display element 10 of FIG. 1 are described below in relation to FIGS. 2 and 3.

Figure 2:
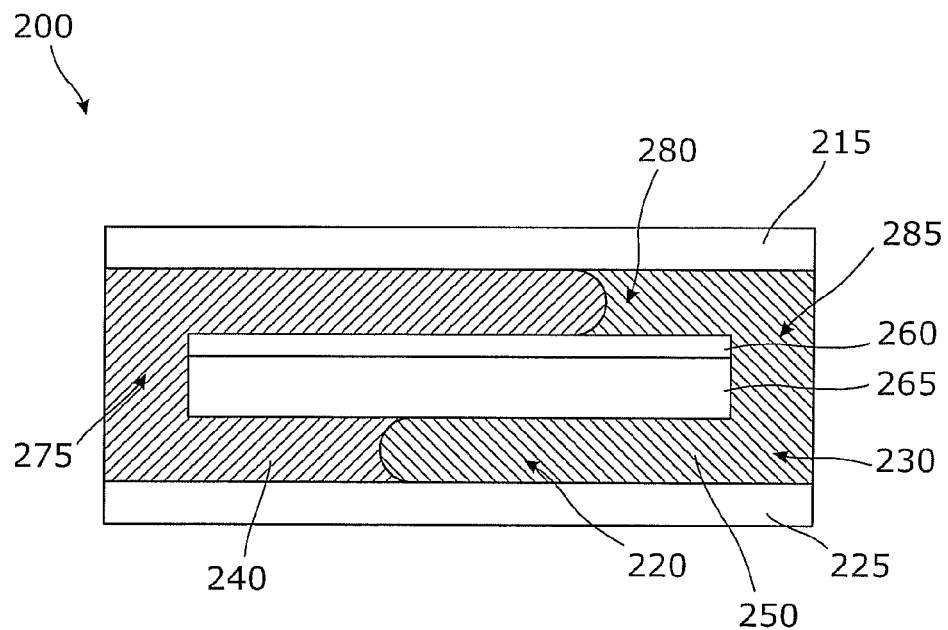
FIG. 2 is a schematic side view of a monochromatic display element in accordance with a second example of the present disclosure.

FIG. 2 is a schematic side view of an implementation example of a single color display element according to the present disclosure.

Display element 200 comprises a first, substantially transparent substrate 215, forming a front of the display element 200, and a second substrate 225 separated from the first substrate 215 to define a cavity 230 therebetween. Display element 200 further comprises a reflector layer 260, for example on an upper surface of a third substrate 265, in the cavity 230 and separated from the first and second substrates 215, 225. A visible area of display element 200 may comprise at least part of an area above reflector layer 260.

A first channel 280 is defined in the cavity 230 above the reflector layer 260, and a second channel 220 is defined in the cavity 230 below the reflector layer 260. Second channel 220 provides a fluid reservoir, as discussed below. First and second channels 280, 220 are interconnected by one or more apertures 275, 285 through the reflector layer 260 (and third substrate 265). In the illustrated example, apertures 275, 285 are provided at respective lateral ends of the display element 200.

A luminescent fluid 240 and an immiscible light absorbing fluid 250 (e.g., black fluid) are contained within, and movable between, the interconnected first and second channels 280, 220.

In particular, the luminescent fluid 240 emits, and may also scatter, light corresponding to the color of the display element.

The luminescent fluid 240 may comprise a solution of luminescent species comprising dye molecules (e.g., photoluminescent dye molecules), examples of which include, without limitation: BODIPY dyes, perylenes, pyromethenes, rhodamines, sulforhodamines, coumarins, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures and derivatives thereof. Non-limiting examples of specific porphyrin and porphyrin derivatives may include etioporphyrin 1 (CAS 448-71-5), deuteroporphyrin IX 2,4 bis ethylene glycol (D630-9) available from Frontier Scientific, and octaethyl porphrin (CAS 2683-82-1), azo dyes such as Mordant Orange CAS 2243-76-7, Methyl Yellow (60-11-7), 4-phenylazoaniline (CAS 60-09-3), Alcian Yellow (CAS 61968-76-1), available from Aldrich chemical company, and mixtures thereof.

The luminescent fluid 240 may comprise a solution of luminescent species comprising oligomeric or polymeric molecules (e.g., photoluminescent molecules).

The luminescent fluid 240 may comprise luminescent species suspended in a fluid medium, the luminescent species comprising luminescent particles (e.g., photoluminescent particles), examples of which include: luminescent pigments, luminescent dye molecules, oligomers or polymers in a solid host matrix such as a substantially transparent polymer, to form luminescent particles.

The luminescent fluid 240 may comprise luminescent species suspended in a fluid medium. The luminescent species may absorb light within a range of wavelengths and then emit light in a different (possibly overlapping) range of wavelengths (corresponding to the color of the display element), as described above. The luminescent species may be chosen to absorb light over a broad range of wavelengths shorter than the emission waveband, and emit light at desired wavelengths. The luminescent species may be arranged in an irregular or crystalline structure. Suitable luminescent species include colloidal semiconducting nanoparticles with or without dopants such as rare earth ions, or luminescent pigment particles containing luminescent dye molecules, oligomers or polymers. For example, the luminescent species may include, without limitation: quinoline dyes, porphyrins, porphins, colloidal semiconducting nanoparticles including particles with II-VI (e.g., CdSe) cores and (possibly) III-VI shells (e.g., CdS, ZnS), or III-V based particles (e.g., GaAs, InP, etc.), and mixtures and derivatives thereof.

The luminescent fluid 240 may also include other materials, such as antioxidants, or ultraviolet (UV) absorbers to prevent photo-bleaching, in addition to appropriate solvents and surfactants.

The light absorbing fluid 250 may comprise absorbing pigments or dyes that render it black, for example, carbon black particles suspended in a solvent. Thus, light absorbing fluid 250 may absorb substantially all wavelengths in the visible spectrum.

Display element 200 further comprises electrodes (not shown) positioned so as to move luminescent fluid 240 and light absorbing fluid 250 by electrofluidic effects, such as electrowetting, in response to applied signals such as biasing voltages. One suitable technique for moving luminescent fluid 240 and light absorbing fluid 250 is described in Applied Physics Letters 97, 143501 (2010) entitled "High Reflectivity Electrofluidic Pixels with Zero-Power Grayscale Operation" by S Yang at al. Thus, for example, reflector layer 260 and first substantially transparent substrate 215 each may be electrically conducting and form electrodes, for use in controlling the operation of the display element 200.

In a first state (fully ON state), the luminescent fluid 240 is positioned entirely within the first channel 280 above the reflector layer 260, and thus substantially occupies the visible area of the display element 200, and the light absorbing (e.g., black) fluid 250 is positioned entirely within the second channel/reservoir 220. The display element 200 produces light in the typically narrow emission waveband of the luminescent fluid (e.g., red, green or blue), and thus appears the corresponding color. In a second state (fully OFF state), the light absorbing fluid 250 is positioned entirely within the first channel 280 above the reflector layer 260, and thus substantially occupies the visible area of the display element 200, and the luminescent fluid 240 is positioned entirely within the second channel/reservoir 220. The light absorbing fluid 250 of display element 220 typically absorbs light across all visible wavelengths, and thus appears black.

A plurality of intermediate states exist between the above-mentioned first, fully ON state and the above-mentioned second, fully OFF state, such as the state illustrated in FIG. 2. In these intermediate states, luminescent fluid 240 and light absorbing fluid 250 are partly in the first channel 280 above the reflector 260 and partly in the second channel 220 below the reflector 260, so that the display element 200 is electrically controllable to provide a range of color intensities.

The use of a luminescent fluid 240 to modulate light and produce the desired color of the display element, in the (fully or partly) ON state, provides improved brightness compared with conventional, absorber-based light modulating fluids. In addition, luminescent light emitted by luminescent fluid 240 downwardly is reflected back to the viewer by the reflector 260. Reflector 260 may also reflect wavelengths that contribute to the desired color but are not absorbed or emitted by the luminescent fluid 240.

In example implementations, reflector 260 may be a wavelength-selective reflector for selectively reflecting wavelengths that are absorbed by the luminescent fluid 240 and/or contribute to the desired color, and for transmitting (or absorbing) other wavelengths.

In other example implementations, reflector 260 may comprise a broadband (visible spectrum) reflector together with an absorber layer that absorbs undesired wavelengths that are not absorbed by the luminescent fluid 240. For example, for a green-producing display element, the luminescent fluid 240 may absorb ambient blue and shorter wavelength green light, and convert the absorbed energy to green light, and the absorber layer absorbs red light. Thus, reflector 260 reflects the emitted green wavelengths and any longer ambient green wavelengths that contribute to the desired green color, but does not reflect red wavelengths, which will not be absorbed by the luminescent fluid 240.

Groups of three different single color display elements (e.g., red, green and blue or cyan, magenta and yellow, display elements) according to the implementation example of FIG. 2, may be arranged side-by-side to form full color display elements/pixels in an array of rows and columns to provide a full color display, as discussed further below.

Figure 3:
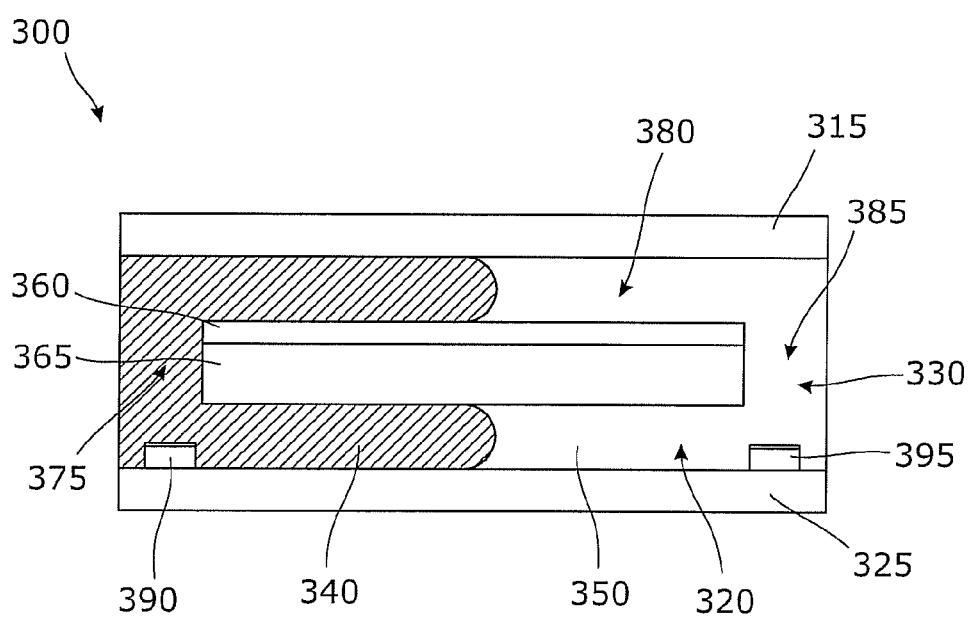
FIG. 3 is a schematic side view of a monochromatic display element in accordance with a third example of the present disclosure.

FIG. 3 is a schematic side view of another implementation example of a single color display element according to the present disclosure.

Display element 300 comprises a first, substantially transparent substrate 315, forming a front of the display element 300, and a second substrate 325 separated from the first substrate 315 to define a cavity 330 therebetween. Display element 300 further comprises a light absorbing layer 360, for example on an upper surface of a third substrate 365, in the cavity 330 and separated from the first and second substrates 315, 325. A visible area of display element 300 may comprise at least part of an area above light absorbing layer 360.

A first channel 380 is defined in the cavity 330 above the light absorbing layer 360, and a second channel 320 is defined in the cavity 330 below the light absorbing layer 360. Second channel 320 provides a fluid reservoir, as discussed below. First and second channels 380, 320 are interconnected by one or more apertures 375, 385 through the light absorbing layer 360. In the illustrated example, apertures 375, 385 are provided at respective lateral ends of the display element 300.

A luminescent fluid 340 is contained within, and movable between, the interconnected first and second channels 380, 320. In particular, the luminescent fluid 340 emits, and may also scatter, light corresponding to the color of the display element, as described above. The luminescent fluid 340 may comprise a solution of luminescent species e.g., dye molecules, oligomers or polymers that absorb light within a range of wavelengths and then emit light in a different (possibly overlapping) range of wavelengths (corresponding to the color of the display element). The luminescent fluid 340 may comprise luminescent species, suspended in a fluid medium, that absorb light within a range of wavelengths and then emit light in a different (possibly overlapping) range of wavelengths (corresponding to the color of the display element). Examples of suitable luminescent species are described above in relation to the luminescent fluid 240 of the example of FIG. 2. The luminescent species may be chosen to absorb light over a broad range of wavelengths shorter than the emission waveband. The luminescent fluid 340 may also include other materials as discussed above in relation to luminescent fluid 240 of the example of FIG. 2.

The light absorbing layer 360 may comprise an absorbing material that renders it black, for example, carbon black. Thus, light absorbing layer 360 may absorb substantially all wavelengths in the visible spectrum.

In an example implementation, the electrofluidic cell formed by the interconnected first and second channels 380, 320 may also include a substantially transparent fluid that is immiscible with the luminescent fluid 340 (e.g., a transparent oil).

Display element 300 further comprises electrodes, such as electrodes 390, 395 positioned in second channel 220. In addition, portions of first substantially transparent substrate 315 may be electrically conducting and form a further electrode. Signals, such as bias voltages, may be applied to the electrodes to control the operation of the display element 300, so as to move the luminescent fluid 340 by electrofluidic effects such as electrowetting.

In a first state (fully ON state), the luminescent fluid 340 is positioned entirely within the first channel 280 above the light absorbing layer 360, and thus substantially occupies the visible area of the display element 300. The display element 300 produces light in the typically narrow emission waveband of the luminescent fluid (e.g., red, green or blue), and thus appears the corresponding color. In a second state (fully OFF state), the luminescent fluid 340 is positioned entirely within the second channel/reservoir 320 behind the light absorbing layer 360. The light absorbing layer 360 absorbs light substantially across all visible wavelengths, and thus the display element 300 appears black.

A plurality of intermediate states exist between the above-mentioned first, fully ON state and the above-mentioned second, fully OFF state, such as the state illustrated in FIG. 3. In these intermediate states, luminescent fluid 340 is partly in the first channel above the light absorbing layer 360 and partly in the second channel below the light absorbing layer 360, so that the display element 300 is electrically controllable to provide a range of color intensities.

Groups of three different single color display elements (e.g., red, green and blue, or cyan, magenta and yellow, display elements) according to the implementation example of FIG. 3, may be arranged side-by-side to form full color display elements/pixels in an array of rows and columns to provide a full color display, as discussed further below.

Figure 4A:
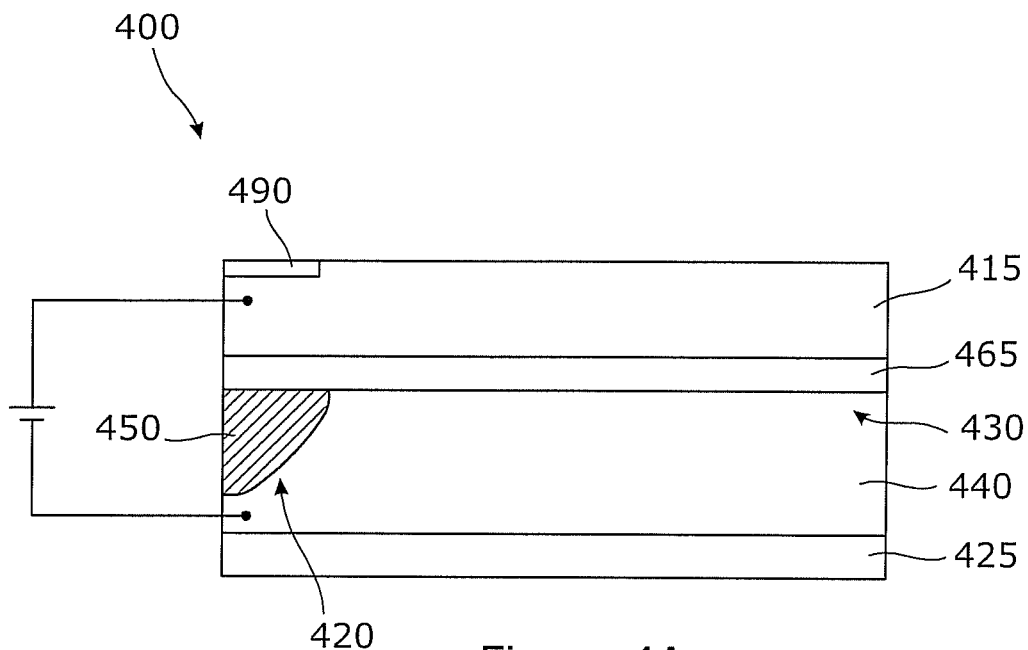
FIG. 4A is a schematic side view of a monochromatic display element in accordance with a fourth example of the present disclosure, in a first state.
Figure 4B:
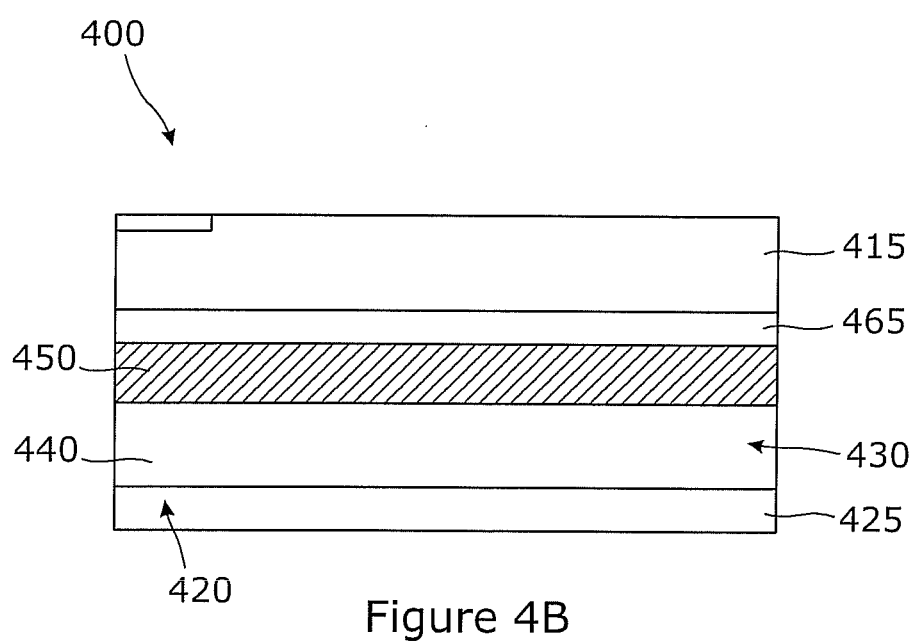
FIG. 4B is a schematic side view of the monochromatic display element of FIG. 4A in a second state.

FIGS. 4A and 4B are schematic side views of another example of a single color display element according to the present disclosure, shown in first and second states, respectively.

The example display element of FIGS. 4A and 4B differs from the example of FIG. 1, in that a light absorbing fluid is movable into and out of a substantial part of a viewing area, in an electrofluidic cell comprising a luminescent fluid, in order to effectively act as an "optical shutter" for controlling the display element.

Display element 400 comprises a first substantially transparent substrate 415, forming a front of the display element 400, and a second reflective substrate 425 separated from the first substantially transparent substrate 415 to define a cavity 430 therebetween. Display element 400 further comprises an electrically insulating layer 465 separating the first substantially transparent substrate 415 and the cavity 430. A visible area of display element 400 may comprise at least part of an area above the reflective substrate 425.

A luminescent electrically conductive fluid 440 and an immiscible light absorbing (e.g., black) fluid 450 are contained within the cavity 430. In particular, the luminescent fluid 440 emits, and may also scatter, light corresponding to the color of the display element.

The luminescent fluid 440 may comprise an electrically conductive solution of luminescent species e.g., dye molecules, oligomers or polymers that absorb light within a range of wavelengths and then emit light in a different (possibly overlapping) range of wavelengths (corresponding to the color of the display element). The luminescent fluid 440 may comprise luminescent species, suspended in a substantially transparent electrolyte, that absorb light within a range of wavelengths and then emit light in a different (possibly overlapping) range of wavelengths (corresponding to the color of the display element). Examples of suitable luminescent species are described above in relation to the luminescent fluid 240 of the example of FIG. 2. The luminescent species may be chosen to absorb light over a broad range of wavelengths shorter than the emission waveband. The luminescent fluid 440 may also include other materials as discussed above in relation to luminescent fluid 240 of the example of FIG. 2.

The light absorbing fluid 450 may comprise light absorbing pigments or dyes that render it black, for example, carbon black particles in a electrically displaceable dielectric fluid such as an oil. Thus, light absorbing layer 360 may absorb substantially all wavelengths in the visible spectrum. The light absorbing fluid 450 may comprise light absorbing pigments or dyes for selectively absorbing wavelengths emitted by the luminescent species and wavelengths that are not absorbed by the luminescent species, and thus act as an "optical shutter" for the luminescent fluid 440 and reflector 425.

The light absorbing fluid 450 and the luminescent fluid 440 are chosen to have different dielectric properties and interface energies (also known as "electrowetting energies"), to enable control over the positions of the two different fluids within the electrofluidic cell.

A portion of the first substantially transparent substrate 415 may be electrically conducting so as to form an electrode 490, in order that a voltage difference can be applied between electrode 490 and luminescent electrically conductive fluid 440, as a control signal. Thus, the light absorbing fluid 450 may be displaced into a region 420 of the electrofluidic cell e.g., at a lateral extremity of the cavity 430, by electrofluidic effects such as electrowetting when a voltage difference is applied between substrate 415 and luminescent fluid 440. In particular, implementation examples may be configured based on electrowetting display technology, for example as described in Nature 425, 383 (2003) entitled "Video-speed electronic paper based on electrowetting" by R. A. Hayes & B. J. Feenstra.

In the illustrated example, electrode 490 is formed as a strip above the region 420. Region 420 may be outside the visible area of the display element 400. Region 420 may be at the edge of, or even inside, the visible area of the display element 400, and typically occupies a relatively small part of the visible area (e.g., less than 10%).

In a first state (fully ON state), a voltage difference is applied as shown in FIG. 4A. The light absorbing (e.g., black) fluid 450 is displaced into region 420 so that luminescent fluid 440 is generally continuous over, and thus occupies a substantial part of, the visible area of the display element 400 without being shielded by the light absorbing fluid 450. Thus, the luminescent fluid 440 within display element 400 absorbs a range of e.g., shorter wavelengths of incident light and emits light in the typically narrow emission waveband of the luminescent fluid (e.g., red, green or blue), and thus appears the corresponding color. The color intensity is enhanced by the inclusion of substrate/reflector 425 forming a mirror to reflect downwardly emitted luminescent light back towards the viewer.

In a second state (fully OFF state), no voltage difference is applied as shown in FIG. 4B. The light absorbing fluid 450 forms a continuous film above the luminescent fluid 440 extending across the visible area of the display element 400, so that luminescent fluid 440 is optically shielded by the light absorbing fluid 450. This may be achieved by selecting appropriate properties for the luminescent fluid 440 and the light absorbing fluid 450, such as different dielectric properties and interface energies (electrowetting energies), and/or by selecting appropriate surface materials on the electrically insulating layer 465 or substrate 425. The light absorbing fluid 450 of display element 400 typically absorbs light across all visible wavelengths, and thus display element 400 appears black.

Groups of three different single color display elements (e.g., red, green and blue, or cyan, magenta and yellow, display elements) according to the implementation example of FIGS. 4A and 4B, may be arranged side-by-side to form full color display elements/pixels in an array of rows and columns to form a full color display, as discussed further below.

Figure 5:
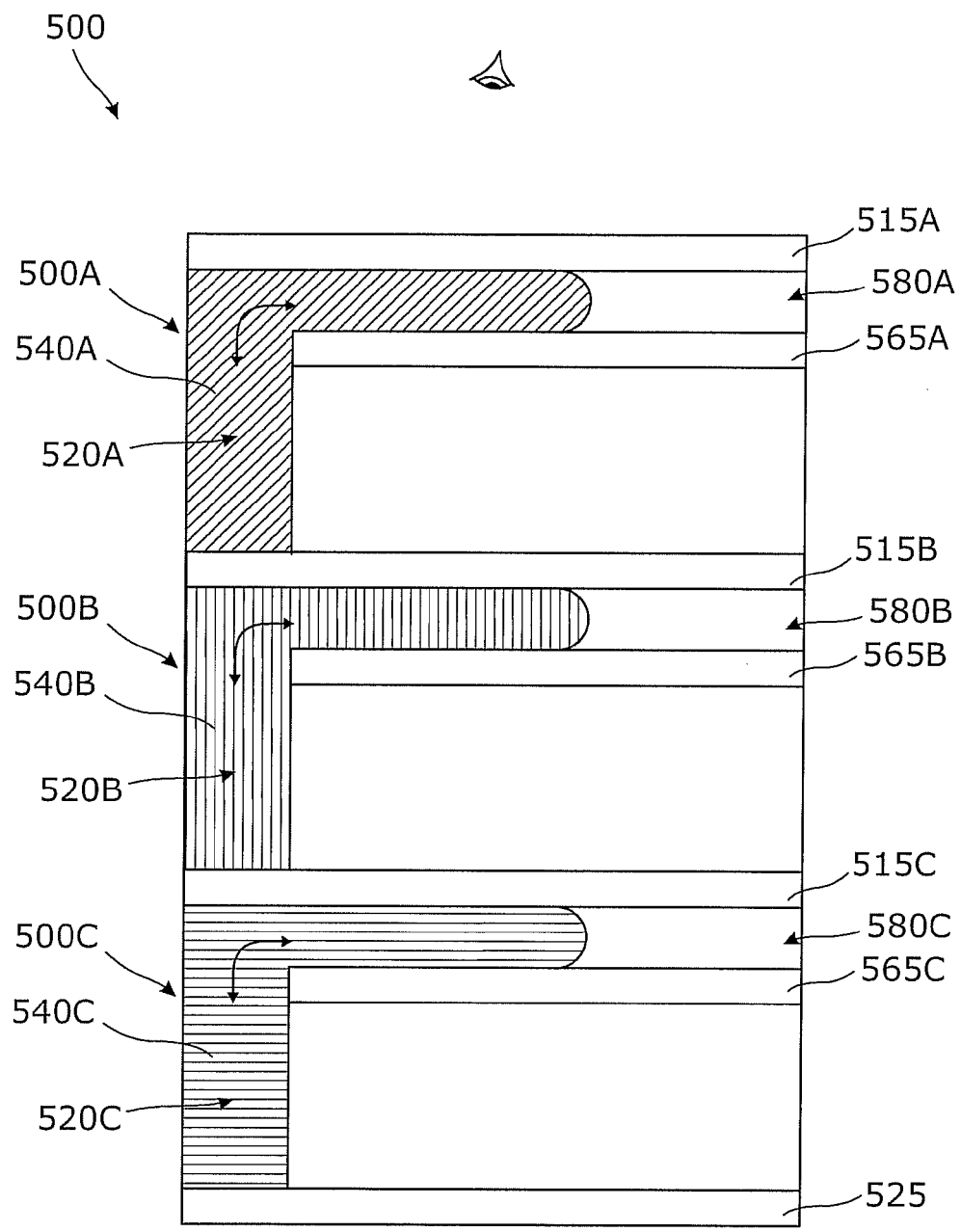
FIG. 5 is a schematic side view of a full color display element in accordance with a fifth example of the present disclosure.

FIG. 5 is a schematic side view of an example of a full color display element according to the present disclosure.

Display element 500 comprises a stack of three display element components 500A, 500B and 500C of similar architecture, each containing a different light modulating fluid.

In particular, each display element component comprises a first, substantially transparent substrate 515, and a second substrate 565 separated from, and substantially parallel to, the substantially transparent substrate 515 to define a channel 580 in the visible area of the display element component 500. In addition, each display element component comprises a reservoir 520, extending substantially orthogonally to the channel 580 at a lateral end thereof. A portion of the substantially transparent substrate 515 is electrically conductive and forms a first electrode of each display element component, and the second substrate 565 has an electrically conductive portion that forms a second electrode.

A light modulating fluid 540, which may comprise a luminescent fluid, a light absorbing fluid and/or a light scattering fluid, is contained within reservoir 520 and is movable out of the reservoir 520 and along the channel 580 by electrofluidic effects such as electrowetting. The light modulating fluid 540 may emit and/or scatter light that contributes to the color of the display element component.

In particular, light modulating fluid 540 may comprise a luminescent fluid, which may comprise a solution of luminescent species, e.g., luminescent dye molecules, oligomers or polymers that absorb light within a range of wavelengths and then emit light in a different (possibly overlapping) range of wavelengths (corresponding to the color of the display element). The luminescent fluid may comprise luminescent species, suspended in a fluid medium, that absorb light within a range of wavelengths and then emit light in a different (possibly overlapping) range of wavelengths (corresponding to the color of the display element). Examples of suitable luminescent species are described above in relation to the luminescent fluid 240 of the example of FIG. 2. The luminescent species may be chosen to absorb light over a broad range of wavelengths shorter than the emission waveband. The luminescent fluid may also include other materials as discussed above in relation to luminescent fluid 240 of the example of FIG. 2.

Light modulating fluid 540 may comprise a light absorbing fluid for selectively absorbing light. The light absorbing fluid may comprise any suitable light absorbing fluid which may absorb light within a range of wavelengths and transmit light of other wavelengths.

Bias voltages may be applied to the electrodes formed by portions of the first and second substrates 515 and 565 to control the operation of each display element component, so as to move the luminescent fluid 540 along the channel 580 into the visible area (as shown by arrows in FIG. 5), by electrofluidic effects such as electrowetting.

In an example implementation, the first display element component 500A, which is first in the incident light path, includes a light absorbing fluid 540A that absorbs red wavelengths and transmits blue and green wavelengths. The second substrate 565A of the first display element component 500A is substantially transparent to allow transmission of light to and from the second and third display element components 500B & 500C. The second display element component 500B, which is next in the incident light path, includes a luminescent fluid 540B that absorbs green wavelengths and converts them so as to emit red wavelengths. The second substrate 565B of the second display element component 500B is substantially transparent to allow transmission of light to and from the third display element component 500C, and a reflector (not shown), for (selectively) reflecting red wavelengths, may be included above second substrate 565B. Finally, the third display element component 500C, which is last in the incident light path, includes a luminescent fluid that absorbs blue (and possibly near UV) wavelengths and converts them so as to emit green wavelengths. A mirror 525, which may include a fixed UV to blue luminescent layer on an upper surface thereof, may be included at the bottom of the display element component 500C, in which case the second substrate 565C of the third display element component 500C is substantially transparent to allow transmission of light to and from the mirror 525. Mirror 525 may be a (visible spectrum) broadband reflector or may be a reflector for selectively reflecting red wavelengths, if such a reflector is not used above the third display element component 500C.

Table 1 below provides example settings of the luminescent fluids of components 500A, 500B and 500C of this example implementation of the example stacked full color display element 500 of FIG. 5, to achieve the various colors indicated, when ambient white light is incident thereon.

TABLE 1

| Active Layer | Red | Green | Blue | White | Black | Cyan | Yellow | Magenta |
|---|---|---|---|---|---|---|---|---|
| Red absorb, fluid 540A | 0 | 1 | 1 | 0 | 1 | 1 | 0 | 0.382 |
| Green→Red, luminescent fluid 540B | 1 | 0 | 1 | 0 | 1 | 0 | 0.177 | 1 |
| Blue→Green, luminescent fluid 540C | 1 | 1 | 0 | 0 | 1 | 0 | 1 | 0 |

In Table 1, the value "0" means transparent (the light absorbing/luminescent fluid 540 is contained in the reservoir 520 out of the visible area of the display element component) and the value "1" means fully absorbing (the light absorbing/luminescent fluid 540 extends along channel 580 substantially fully occupying the visible area of the display element). Yellow is defined as approximately equal amounts of red and green (i.e., just absence of blue), cyan is defined as absence of red, and magenta is defined as absence of green. For the purpose of this illustrative example, it is assumed that there are perfect conversion efficiencies and ideal absorption spectra. The values given in Table 1 may be adjusted to produce the desired colors in cases where perfect conversion efficiencies and ideal absorption spectra are not obtained. In addition, uniform spectrum and photopic responses are assumed, and the possibility of incorporating a fixed UV-to-blue converting fluid is ignored for purposes of the examples provided in Table 1.

Thus, in this example implementation, to achieve the color red (first column of Table 1), the first display element 500A is in a transparent state (the red light absorbing fluid 540A is contained within reservoir 520A outside of the visible area), so that light of all wavelengths is transmitted through the first display element 500A component to the second display element component 500B; the second display element is in a fully absorbing state (the luminescent fluid 540B extends fully across the visible area), so that green wavelengths are absorbed and red wavelengths are emitted, and only blue wavelengths are transmitted through to the third display element component 500C (assuming the presence of a red selective reflector below the second display element 500b, which reflects red wavelengths back to the viewer; otherwise both blue and red wavelengths are transmitted), and the third display element 500C is in a fully absorbing state (the luminescent fluid 540C extends across the visible area) so that blue wavelengths are absorbed and green wavelengths are emitted. Bottom mirror reflects green wavelengths (and red wavelengths, in the absence of the red selective reflector), back to the second display element component 500B, which, in turn, are converted to red wavelengths and reflected back to the viewer. Thus, only red light is reflected back to the viewer to display the color red.

Similarly, the colors green, blue, white, black, cyan, yellow and magenta are achieved by the settings of the first, second and third display element components 500A-C as indicated in Table 1.

Display Examples

Figure 6:
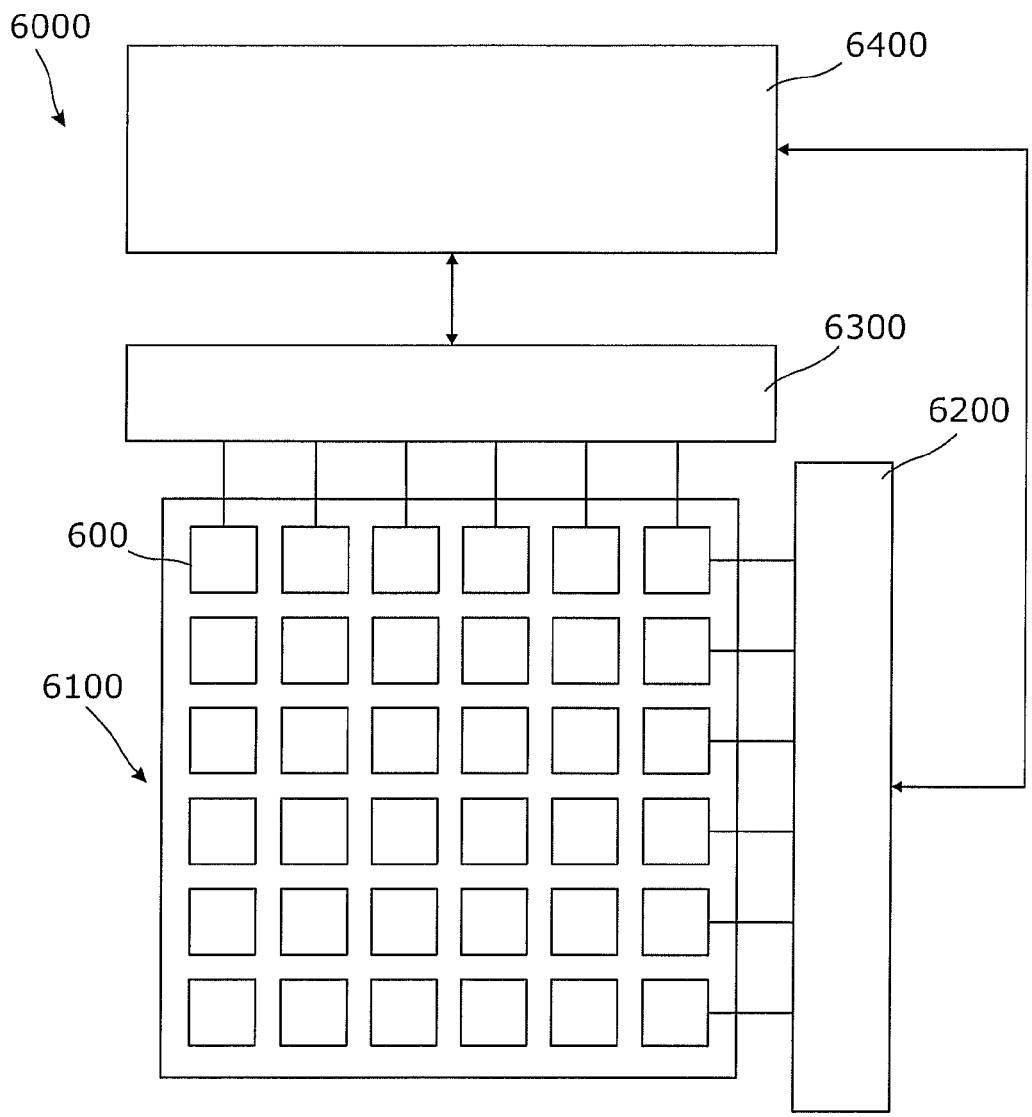
FIG. 6 is a schematic diagram of a display device implementing color display elements in accordance with an example of the present disclosure.

FIG. 6 schematically illustrates a display device 6000 formed from an array of color display elements 600 according to examples of the present disclosure.

Display device 6000 comprises an array 6100 of rows and columns of full color display elements 600. As described above, in some example implementations, a full color display element/pixel is formed by a group of three different single color display element components/sub-pixels (e.g., red, green and blue display element components) of FIG. 1, 2, 3 or 4, arranged in side-by-side configuration. The relative areas of the different color display elements in a group forming a full color display element/pixel may be selected to provide an appropriate color balance. In other example implementations, a full color display element/pixel is formed by a group of three different single color display element components, arranged in a stacked configuration. A suitable stacked implementation is described above in relation to FIG. 5.

Typically the display element/display element components in the array are fabricated with common, substantially transparent substrates/electrodes and other features, as appropriate.

In a stacked display element architecture, each stacked display element 600 forms a color pixel of full color reflective display 6000. In a side-by-side configuration, a group of three different single color display elements forms a color pixel 600 of full color reflective display 6000.

Each single color display element component 600A-C of each color display element 600 is independently controllable by a column driver 6200 and a row driver 6300. The column driver 6200 and a row driver 6300, under the control of a processor 6400, provide electrical signals to the electrowetting electrodes (or equivalent) of each of the color display elements 600 to control the state thereof. Thus, the state of each color display element 6000 is electrically controlled to modulate incident ambient light so as to produce the color for the corresponding pixel, as described above, so that the array displays a full color image.

By the inclusion of luminescent fluids in the display elements/display element components, a greater proportion of the spectrum of ambient incident light is used to produce the displayed color, in comparison to reflective display elements that merely reflect the part of the spectrum of ambient light corresponding to the displayed color. Thus, brighter reflective displays can be formed, which are capable of showing vibrant colors using ambient illumination. In addition, the use of appropriate luminescent species with narrow emission spectra can provide more saturated colors, with larger color gamuts.

Alternative Examples

A full color display element may be formed from various different combinations of two, three or four different single color display element components. For example, in side-by-side architectures, combinations of two display element components (e.g., cyan and red producing components), three display element components (e.g., red, green and blue producing or yellow, cyan and magenta producing components) or four display element components (e.g., red, green, blue and white producing components) may be employed to produce a pixel having the desired (partial or full) color gamut.

In the above described stacked architecture example of FIG. 5, a full color display element is formed from display element components comprising red absorbing, green to red luminescent and blue to green luminescent fluids, respectively. Other example color combinations are possible. For example, a display element may be formed from two or three display element components selected from: red, yellow, green, cyan and blue, arranged in a stacked configuration from the longest wavelengths to shortest wavelength, where the first (longest wavelength) display element component comprises an appropriate light absorbing fluid, and each of the other display element components comprises an appropriate luminescent fluid. Thus, other examples include a full color display element formed from three display element components comprising yellow absorbing, green to red/yellow luminescent and blue to green luminescent fluids, respectively. Other combinations may include non-primary colors, such as an orange light absorbing fluid instead of a red or yellow light absorbing fluid.

Whilst many of the described and illustrated display element implementations are designed to use electrowetting techniques to move a fluid within an electrofluidic cell, other example display elements may be designed to use other electrofluidic effects. For example, electrofluidic cell designs may be implemented that use pressure based control forces to provide fluid movement. Thus, the structure and configuration of the display elements, including the location of any electrodes, is determined based on design considerations, according to the application.

Whilst the display examples concern a reflective display, display element examples according to the present disclosure may be implemented in displays incorporating light sources, such as a front or side light, to provide illumination in the absence of adequate ambient light.

Various modifications and changes can be made to the described and illustrated examples, consistent with the present disclosure.

For example, an implementation of the example of FIG. 1 may include a light absorbing layer above the lower surface 34 of the channel, which absorbs light when the luminescent fluid 40 is solely within the reservoir, outside the visible area, to provide an improved black state (OFF state).

In an implementation of the example of FIGS. 4A and 4B, the mirror 425 may only reflect wavelengths of the luminescent light and any additional wavelengths that are not absorbed by the luminescent layer but do contribute to the desired color state. In addition, the absorbing layer may only absorb the luminescent wavelengths and the additional reflected wavelengths, in accordance with design requirements.

Another example is the reverse situation of the example of FIGS. 4A and 4B, in which luminescent species are in a transparent oil (or equivalent), and light absorbing (e.g., black) species are in a polar, conducting solvent, and the conducting solvent is expanded/contracted. This would require different interface energies between the fluids and walls.

In the described implementation example of FIG. 5, a selective reflector may be included above the second substrate of the second display element component. In other implementations, a selective reflector may be positioned at any suitable position in, or between, the second and third display element components, such as above the first substrate of the third display element component.

Accordingly, the examples should not be regarded as limiting the scope of the present disclosure, which is defined in the accompanying claims

The invention claimed is:
1. A display element comprising:
a reservoir;
a channel connected to the reservoir, the channel extending across an area including a visible area of the display element, and the reservoir substantially outside the visible area;
at least one electrode; and a luminescent fluid in the reservoir and movable, by means of signals applied to the at least one electrode, between a first position in which the luminescent fluid is substantially contained in the reservoir outside the visible area and a second position in which the luminescent fluid extends along the channel to occupy the visible area; the luminescent fluid for absorbing light in a first color waveband for converting absorbed light to light in a second color waveband different from the first color waveband.

2. A display element as claimed in claim 1, further comprising a reflector.

3. A display element as claimed in claim 1, wherein:
the first color waveband is a broad absorption waveband, and/or
the second color waveband is a narrow emission waveband.

4. A display element as claimed in claim 1, wherein the luminescent fluid comprises an electrically movable fluid comprising luminescent species.

5. A display element as claimed in claim 1, further comprising a light absorbing layer for absorbing light of selected wavelengths in the visible spectrum, or substantially all wavelengths in the visible spectrum.

6. A display element as claimed in claim 5, wherein the light absorbing layer comprises a light absorbing fluid in the reservoir, the light absorbing fluid immiscible with the luminescent fluid, and movable between a first position in which the light absorbing fluid extends along the channel to occupy the visible area, and a second position in which the light absorbing fluid is substantially contained in the reservoir outside the visible area.

7. A display element as claimed in claim 5, wherein the light absorbing layer is a fixed layer on the bottom of the channel and extending across the visible area.

8. A reflective display device comprising:
an array of display elements as claimed in any preceding claim, and
driver circuitry to control the display elements in order to display images.

9. A reflective display comprising:
an array of color display elements, each color display element comprising:
a group of three display element components, each of the three display element components producing a different color, the group of three color display element components arranged side-by-side, each display element component comprising:
a display element as claimed in claim 1.

10. A reflective display as claimed in claim 9, wherein the three display elements produce:
red, blue and green light, respectively;
yellow, cyan and magenta light, respectively, or
any combination of three colors which together produce light across substantially the entire visible spectrum.

11. A display element comprising:
a channel extending across an area including a visible area of the display element, the channel including a region outside, or occupying a relatively small part of, the visible area
at least one electrode;
a luminescent fluid in the channel for absorbing tight in a first color waveband and for converting absorbed light to light in a second color waveband different from the first color waveband, and
a light absorbing fluid in the channel and movable, by means of signals applied to the at least one electrode, between a first position in which the light absorbing fluid is substantially contained in the region of the channel, and a second position in which the light absorbing fluid extends along the channel, above, and optically shielding, the luminescent fluid, to occupy the visible area.

12. A display element as claimed in claim 11, comprising a substantially transparent electrode overlying, and insulated from, the channel, wherein a signal is applied by applying a voltage difference between the substantially transparent electrode and the electrically conductive luminescent fluid.

13. A display element comprising:
a first display element component at the front side of the display element, the first display element comprising:
a first reservoir;
a first channel connected to the first reservoir, the first channel extending across an area including a visible area of the display element, and the first reservoir substantially outside the visible area;
at least one first electrode; and
a light absorbing fluid in the first reservoir, the light absorbing fluid for absorbing light in a first color waveband and movable, by means of signals applied to the at least one electrode, between a first position in which the light absorbing fluid is substantially contained in the first reservoir outside the visible area and a second position in which the light absorbing fluid extends along the first channel to occupy the visible area;
a second display element component behind the first display element component, for receiving light transmitted by the first display element component, the second display element component comprising:
a second reservoir;
a second channel connected to the second reservoir, the second channel extending across an area including a visible area of the display element, and the second reservoir substantially outside the visible area;
at least one second electrode; and
a first luminescent fluid in the second reservoir, the first luminescent fluid movable, by means of signals applied to the at least one second electrode, between a first position in which the first luminescent fluid is substantially contained in the second reservoir outside the visible area and a second position in which the first luminescent fluid extends along the second channel to occupy the visible area, the luminescent fluid for absorbing light in a second color waveband different from the first color waveband, and for converting the absorbed light to light in the first color waveband; and
a third display element component behind the second display element component for receiving light transmitted by the second display element component, the third display element component comprising:
a third reservoir;
a third channel connected to the third reservoir, the third channel extending across an area including a visible area of the display element, and the third reservoir substantially outside the visible area;
at least one third electrode; and
a second luminescent fluid in the third reservoir, the second luminescent fluid movable, by means of signals applied to the at least one third electrode, between a first position in which the second luminescent fluid is substantially contained in the third reservoir outside the visible area and a second position in which the second luminescent fluid extends along the third channel to occupy the visible area, the second luminescent fluid for absorbing light in a third color waveband different from the first and second color wavebands, and for converting the absorbed light to light in the second color waveband; and a reflector, at the back of the display element, for reflecting light transmitted by the third display element.

14. A display element as claimed in claim 13, wherein:
the first color waveband is red; the second color waveband is green, and the third color waveband is blue.

15. A display element as claimed in claim 13, further comprising:

a reflector in, or between, the second and third display element components, the reflector for selectively reflecting light in the first color waveband.

* * * * *

UNITED STATES PATENT AND TRADEMARK OFFICE
CERTIFICATE OF CORRECTION

| | |
|---|---|
| PATENT NO. | : 9,030,728 B2 |
| APPLICATION NO. | : 14/005752 |
| DATED | : May 12, 2015 |
| INVENTOR(S) | : Gary Gibson et al. |

It is certified that error appears in the above-identified patent and that said Letters Patent is hereby corrected as shown below:

IN THE CLAIMS

In column 13, line 8, in Claim 1, delete "for" and insert -- and for --, therefor.

In column 13, line 61, in Claim 11, delete "tight" and insert -- light --, therefor.

Signed and Sealed this
Twenty-fourth Day of November, 2015

Michelle K. Lee
*Director of the United States Patent and Trademark Office*